(12) United States Patent
Thope et al.

(10) Patent No.: US 9,471,629 B2
(45) Date of Patent: Oct. 18, 2016

(54) METHOD AND APPARATUS FOR VISUAL DYNAMIC DISCOVERY AND ANALYTICS EXPLORATION APPLICATION ON STATIC AND/OR REAL-TIME DATA USING AN A PRIORI MODEL-FREE PROCESS

(71) Applicant: Software AG USA Inc., Reston, VA (US)

(72) Inventors: Karthic Thope, Fairfax, VA (US); John Crupi, Bethesda, MD (US); Daniel Malks, Arlington, VA (US)

(73) Assignee: Software AG USA Inc., Reston, VA (US)

( * ) Notice: Subject to any disclaimer, the term of this patent is extended or adjusted under 35 U.S.C. 154(b) by 239 days.

(21) Appl. No.: 14/255,362

(22) Filed: Apr. 17, 2014

(65) Prior Publication Data

US 2014/0317130 A1 Oct. 23, 2014

Related U.S. Application Data

(60) Provisional application No. 61/814,040, filed on Apr. 19, 2013.

(51) Int. Cl.
*G06F 17/30* (2006.01)
(52) U.S. Cl.
CPC ............................... *G06F 17/30424* (2013.01)
(58) Field of Classification Search
USPC .................................................. 707/754, 779
See application file for complete search history.

(56) References Cited

U.S. PATENT DOCUMENTS

| | | | | |
|---|---|---|---|---|
| 7,389,301 B1* | 6/2008 | Mazzagatti | ....... | G06F 17/30489 |
| 7,593,923 B1* | 9/2009 | Mazzagatti | ....... | G06F 17/30327 |
| 8,458,596 B1 | 6/2013 | Malks et al. | | |
| 2010/0325206 A1* | 12/2010 | Dayal | ................. | G06Q 10/10 |
| | | | | 709/204 |
| 2011/0087614 A1* | 4/2011 | Whittington | ........... | G06Q 10/06 |
| | | | | 705/348 |
| 2013/0226657 A1* | 8/2013 | Bohe | .................. | G06Q 30/0201 |
| | | | | 705/7.29 |
| 2014/0201129 A1* | 7/2014 | Gupta | ............... | G06F 17/30424 |
| | | | | 707/602 |
| 2014/0317130 A1* | 10/2014 | Thope | ............... | G06F 17/30424 |
| | | | | 707/754 |
| 2016/0192321 A9* | 6/2016 | Reed | ....................... | H04W 8/02 |
| | | | | 455/456.4 |

* cited by examiner

*Primary Examiner* — Kim Nguyen
(74) *Attorney, Agent, or Firm* — Posz Law Group, PLC

(57) ABSTRACT

A computer system, a computer-readable non-transitory medium, and/or a computer-implemented method generates analytics applicable to data of an undetermined structure and type. A processor device receives data formatted in an undetermined structure. The processor device discovers, in a cross filter model processor, dynamically in response to receiving the data in the undetermined structure, a structure and a data type of the data which was received in the undetermined structure. The processor device determines, in response to the structure and the data type of the data discovered by the cross filter model processor, which of a plurality of analytic queries are applicable to the data.

20 Claims, 11 Drawing Sheets

SELECT *, count(CustomerID) over(partition BY time_mask(date(TIMESTAMP,"yyyy-MM-dd hh:mm:ss"),'H'),CustomerID,CardID     ORDER BY date(TIMESTAMP,"yyyy-MM-dd hh:mm:ss"),CustomerID,CardID) AS TxnCount,
    sum(Amount) over(partition BY time_mask(date(TIMESTAMP,"yyyy-MM-dd hh:mm:ss"),'H'),CustomerID,CardID     ORDER BY date(TIMESTAMP,"yyyy-MM-dd hh:mm:ss"),CustomerID,CardID) AS AmountWithdrawn
FROM results/records/record
ORDER BY CustomerID, TIMESTAMP

FIG. 7

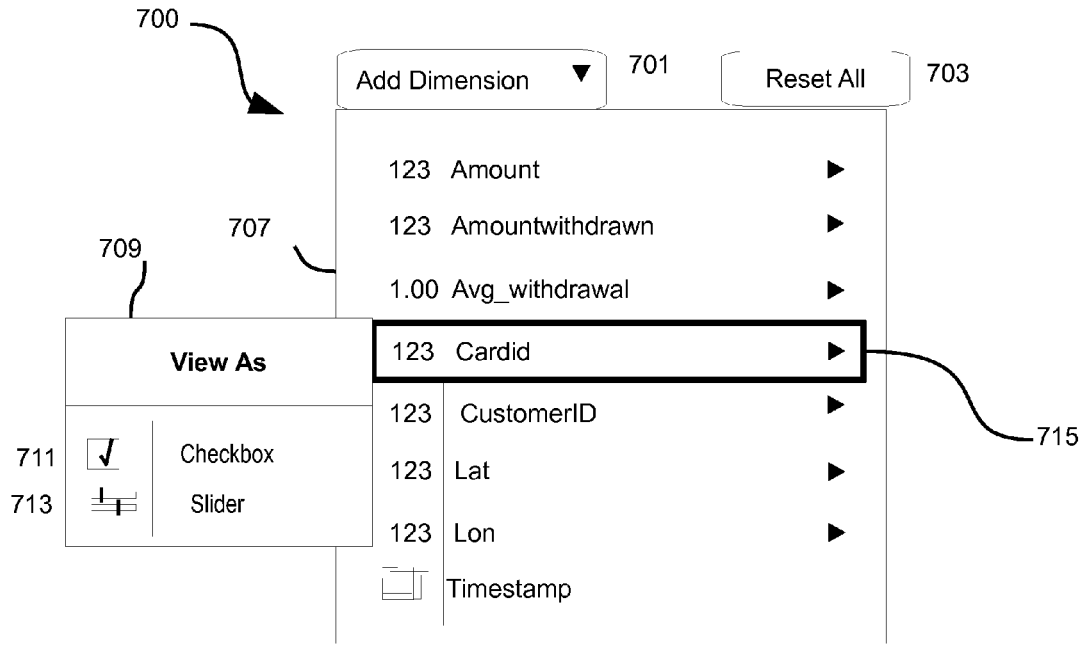

METHOD AND APPARATUS FOR VISUAL DYNAMIC DISCOVERY AND ANALYTICS EXPLORATION APPLICATION ON STATIC AND/OR REAL-TIME DATA USING AN A PRIORI MODEL-FREE PROCESS

CROSS-REFERENCE TO RELATED APPLICATION

This application claims the benefit of the following Provisional application: 61/814,040 filed 19 Apr. 2013, all of which is expressly incorporated herein by reference.

TECHNICAL FIELD

The technical field relates in general to computer networks, and more specifically to analysis of data.

BACKGROUND

In order to make better decisions, faster, users want to be able to do ad-hoc visual analytics and to explore and apply dynamic analytics on historical and real-time data sets without having to do lengthy preparation or modeling of the data up-front and without having in-depth knowledge of the data. Prior solutions require some combination of: up-front modeling of data, detailed knowledge of the data, up-front-data modeling and/or deep technical understanding of the various analytics operations.

In a conventional process illustrated, for example, in FIG. 12, a data source 1201 provides data 1203 which has an a priori known data format, such as from a stock market. A process to generate conventional analytics 1221 has already input 1223 a defined model for the data, such as a model for stock market data. The process then runs 1225 the data into the pre-determined model which is known to be appropriate for the data. A user manually prepares queries 1227 which can be run on data in the pre-determined model. The queries are run, and the query results are displayed 1229 to the user.

SUMMARY

Accordingly, one or more embodiments provides a computer system, a computer-readable non-transitory medium, and/or a computer-implemented method for generating analytics applicable to data of an undetermined structure and type. The method includes receiving, by a processor device, data formatted in an undetermined structure. Also included is discovering, by the processor device in a cross filter model processor, dynamically in response to receiving the data in the undetermined structure, a structure and a data type of the data which was received in the undetermined structure. Also included is determining, by the processor device in response to the structure and the data type of the data discovered by the cross filter model processor, which of a plurality of analytic queries are applicable to the data.

Another embodiment includes displaying, by the processor device on a user interface, the analytic queries which were determined to be applicable to the discovered structure and the discovered data type of the data, and selectable options for the analytic queries, in which all of the analytic queries displayed on the user interface are possible for the discovered structure and the discovered data type of the data;

Still another embodiment includes generating, by the processor device, automatically without user intervention, a selected one or more of the analytic queries, in response to selection of a displayed one or more of the analytic queries and the selectable options for the selected one or more of the analytic queries; and performing, by the processor device, the selected one or more of the analytic queries on the received data.

In yet another embodiment, wherein each of the analytic queries which are displayed is a combination of (i) one or more of the analytic queries which were determined to be applicable to the discovered structure and the discovered data type of the data, and (ii) the data type of the data in the discovered structure which can be operated on by the one or more of the analytic queries.

A further embodiment includes determining, by the processor device, which of a plurality of filters correspond to the discovered data type of the data; displaying, by the processor device on a user interface, selectable options for the filters which were determined to correspond to the discovered structure and the discovered data type of the data; and performing, by the processor device, a selected one or more of the filters on the received data, in response to selection of a displayed one or more of the filters and the selectable options for the one or more of the filters.

In still a further embodiment, the filters for one or more of the data types which is discovered to be numeric include at least an automatic slide to filter numeric values of the data which has a numeric data type to within the selected region.

An embodiment can include determining, by the processor device, which of a plurality of views correspond to the discovered data type of the data; providing a user interface that includes selectable options for the views which were determined to correspond to the discovered structure and data type of the data; and processing, by the processor device, the received data to provide a view of the received data according to a selected one or more of the views and the selectable options for the selected one or more of the views.

In a further embodiment, the data is received by the processor device from one or more of the following: a mashup, a published data stream, and/or a database.

In still another embodiment, the structure of the data is discovered in the cross filter model processor without running the data of the undetermined structure into a model that defines the data.

According to another embodiment, a computer system includes at least a display interface; a user input device interface; and a processor cooperatively operable with the display interface and the user input device interface. The processor is configured to facilitate receiving data formatted in an undetermined structure; discovering, in a cross filter model processor, dynamically in response to receiving the data in the undetermined structure, a structure and a data type of the data which was received in the undetermined structure; and determining, in response to the structure and the data type of the data discovered by the cross filter model processor, which of a plurality of analytic queries are applicable to the data.

Still another embodiment is a non-transitory computer-readable medium storing instructions for executing for a method for generating analytics. The instructions, when executed by a computer, can cause the computer to perform one or more, or a combination, of the foregoing.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 4 is a query generated by user selections corresponding to FIG. 3;

FIG. 7 is a user interface for a visual contextual data filter;

DETAILED DESCRIPTION

Glossary

Figure 1:
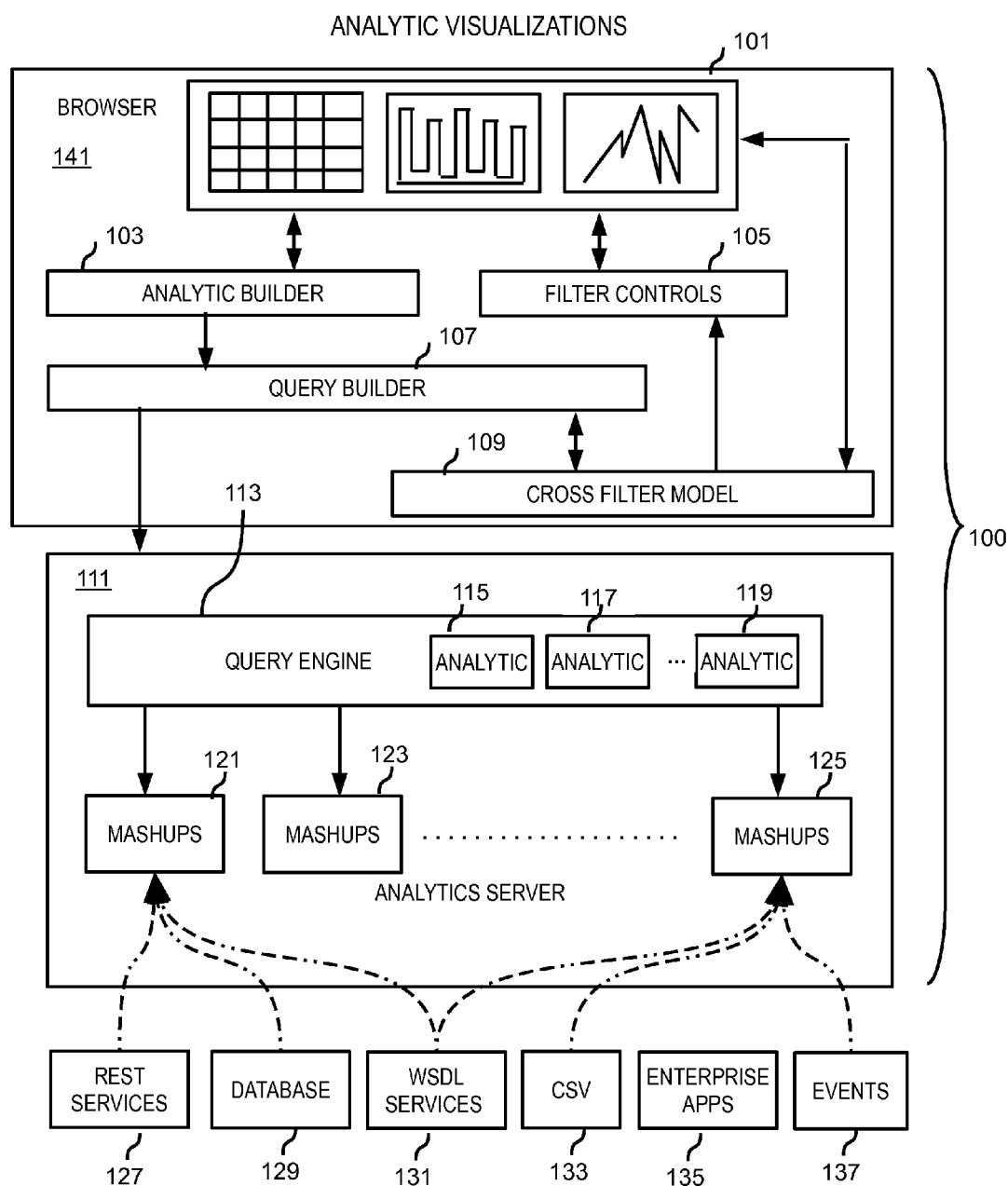
FIG. 1 is a functional block diagram of a system for generating analytics for data using a model-free process.

Mashup—Mashups simplify, combine or transform data to produce just the information you need. Users create mashups that combine or transform results from mashables, databases or from other mashups in useful ways.

For the purpose of this patent application, a "mashup" is defined as a software application that combines pre-existing components from one or more information-providing services into a single tool which can comprise a server-side and a client-side application, where the components used by the mash-up are visually presented to a user on a display at the client-side in a manner which is different from the pre-determined presentation of the information-providing service; and is configured in accordance with standards such as Enterprise Mashup Markup Language ("EMML"), XML interchanged as REST or Web Services, RSS, Atom, and other evolutions and variations of mashup standards. A mashup is to be distinguished from a portal in which content is presented side-by-side in the manner which is the same as the pre-determined presentation of the information-providing service. The designation "component" as used in this paragraph refers to data which is retrieved by a mashup in real-time from an information-providing service. A mashup is frequently made by access to open APIs and other data sources to produce results that were not the original reason for producing the raw source data. An example of a mashup is the use of cartographic data from Google Maps to add location information to real estate data, thereby creating a new and distinct Web service that was not originally provided by either source. The term "service", used in the context of an "information-providing service", is used herein expressly to refer to an information-providing service that provides data from a server in a visual presentation on a display to a user, typically an application programming interface (API) or web API that can be accessed over a computer network and executed on a remote system hosting the requested services, in accordance with Extensible Markup Language messages that follow the Simple Object Access Protocol (SOAP) standard such as SOAP Version 1.2 specification, Web Services Description Language (WSDL) such as Web Services Description Language Version 2.0 Specification, Representational State Transfer (REST) constraints, and variations and evolutions thereof. An example of a service is Google Maps, a Web service or an RSS feed.

Analytics—Analytic queries work within mashups to retrieve, analyze and transform large, streaming datasets. Datasets may come from files, databases, and information sources with URLs, snapshots of mashables or mashups (for example, from Presto) or from datasets already stored in memory. Analytics are sometimes referred to herein as "analytic queries" or "queries."

The term "computer system" or "computer" used herein denotes a device sometimes referred to as a computer, laptop, main frame computer, personal computer, personal digital assistant, personal assignment pad, notebook computer, tablet computer, notepad computer, smart phone with embedded processor, or equivalents thereof. As one example, the computer system may be a general purpose computer, or a specially programmed special purpose computer. It may be implemented as a distributed computer system rather than a single computer. Similarly, a communications link may be World Wide Web, a modem over a POTS line, data links, and/or any other wired or wireless method of communicating between computers and/or users. Moreover, the processing could be controlled by a software program on one or more computer system or processors, or could even be partially or wholly implemented in hardware.

The term "dynamic" or "dynamically" as used herein indicates that data is continuously received or information is continuously updated, and the system responds to the continuously received data or continuously updated information as it is received or updated, for example by iteratively performing operations which occur in response to the data or in response to the information. Thus, a dynamic user interface means that the system responds to continuously received data or continuously updated information which is reflected on the user interface, and the user interface is continuously updated as the data or information is received or updated.

The term "REST" or "representational state transfer" as used herein refers to an architectural style that defines how a well-designed Web application behaves: presented with a network of Web pages (a virtual state-machine), the user progresses through an application by selecting links (state transitions), resulting in the next page (representing the next state of the application) being transferred to the user and rendered for their use. More formally, the REST constraints include (A) Client-Server: a uniform interface separates clients from servers; (B) Stateless: no client context is stored on the server between requests; (C) Cacheable: clients can cache responses; (D) Layered system: intermediary servers can load-balance, provide shared caches, enforce security policies, etc.; (E) Code-on-Demand: executable code can be temporarily transferred to a client; (F) Uniform interface:

identification of resources, manipulation of resources through these representation, self-descriptive messages, and hypermedia as the engine of the application state (HATEOAS). An API may adhere to REST constraints; such API's are sometimes referred to as RESTful.

The term "app" is short for "application," and denotes a computer executable software program that performs a function to benefit the user. Typically the term "app" is used to refer to discrete applications that provide a single function and a simple user interface. The term "app" is sometimes used to refer to programs such as GoogleMaps. An "app" is a way to visualize a mashup. An "app" is different from an operating system that runs the computer.

The term "real-time" (sometimes called "real time" or "realtime") as used herein means that the processor performs actions that keep the information provided to the user current with the data that is being constantly received; manual intervention by a user after the data is received and before the processor performs the real-time action is not required though it may be permitted. For example, a real-time visualization of data received from a mashup or information service calls for processing that continually updates the visualization of the data from the mashup or information service as it is received; and a real-time display of stock ticker data presents visualizations of the stock data as it constantly changes.

The phrase "automatically without user intervention" in a claim is defined to mean that the particular step occurs after the step is initiated until the step is finished without requiring a user to provide input to a processor.

End of Glossary

I. Introduction

In overview, the present disclosure concerns computer systems, sometimes referred to as client/server networks, such as may be associated with computer systems providing apps. Such computer systems often involve running an app on a user's computer that invokes a web service providing live data. More particularly, various inventive concepts and principles are embodied in systems, devices, and methods therein for providing data analysis including discovery of data structure and user-friendly analytics of such data, optionally with visualizations of such data.

The computer systems of particular interest are those providing or facilitating apps over communication networks involving a data server and a user's computer, and the like, and variants or evolutions thereof.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts herein, further discussion of such software and ICs, if any, will be limited to the essentials with respect to the principles and concepts used by the exemplary embodiments.

II. State of the Art/Disadvantages

Traditional data exploration in tools like Tableau and QlikTech typically involve the following steps:

Data typically resides in a single highly structured source such as a database or data warehouse.

Data and data structure are tightly coupled.

Significant Preparation: Data collection, aggregation, loading into some repository to prepare for analysis. In many cases, a lot data cleansing will also be required. Most of these steps are done manually.

Static Results: Analytic visualized are bound to static data and are no longer live. Analysis and exploration are no longer attached to original data source but instead a snapshot of the data Lack of Extensibility: Analytics is limited to what is provided out of the box and cannot be dynamically extended.

No real-time support: Cannot analyze real-time data that are constantly updated and pushed from the source systems.

III. Concept

As further discussed herein below various inventive principles and combinations thereof are advantageously employed to provide a visual dynamic discovery and analytics application which can support one or more of the following:

Data that is dynamically combined (mashed) from multiple disparate data sources.

Data Exploration without up-front modeling

Interactive Visualizations and exploration of large datasets

Dynamic Analytics

Generation of analytics queries

Data Filtering

Overlaying multiple Aggregations visually

Ability to share explorations with other users

The following disclosure provides various principles that disclose how this system allows the exploration and analysis of the data without doing models up front and without data preparation up front. A user can do ad hoc exploration and analysis without up front preparation and modeling. Five things can be considered to be differentiators over conventional analytics systems:

Model Free

No up front preparation

The system generates, dynamically, the analytics

The system handles real-time data and real-time data structures

Analytics and visualizations can be applied simultaneously to data-in-motion and data-at-rest.

The present system is dynamic in nature. The present system has the ability to discover data structures dynamically; the ability to apply, dynamically, the analytics; and the ability to generate the analytics, dynamically, based on the data. By way of comparison, traditional analytics systems require the user to create the models that identify the data structures first, and then run the data against the models. There is also a visualization aspect to the present system. An overview of the present system is provided in FIG. 1.

Reference is now made to FIG. 1, a functional block diagram of a system 100 for generating analytics for data using a model-free process. In overview, the system 100 includes a visualizer 101, an analytic builder 103, filter controls 105, a query builder 107, and a cross filter model processor 109. The visualizer 101, analytic builder 103, filter controls 105, query builder 107, and cross filter model processor 109 may be conveniently grouped in a browser 141. The system 101 also may include a server such as analytics server 111, which causes the system to receive data. Data is received from one or more of the following data sources: a representational state transfer (REST) service 127, a database 129, a web services description language (WSDL) service 131, comma-separated values (CSV) 133, one or more enterprise apps 135, and/or events 137. In this example, receipt of such data is initiated by one or more mashups 121, 123, 125. A query engine 113 includes analytics 115, 117, 119 which can operate on data. The analytics 115, 117, 119 are obtained by the analytics server 111 from the query builder 107 based on the data which is received. The query engine 113 can provide, to the mashups 121, 123, 125, one or more of the analytics 115, 117, 119 which corresponds to the data being operated on by that mashup. All of the analytics which are provided to the mashup 121, 123, 125 can operate on that mashup's data. Furthermore, the analytics 115, 117, 119 which are obtained from the query builder 107 can indicate visualizations (and options that control the visualizations) which are appropriate for that data, filter controls (and options that control the filter controls) which are appropriate for that data Note, this method is performed on data that is not necessarily pre-prepared. Conventional systems require preliminary preparation of the data before performing the analysis. The user defines the models, then runs the analytics on the models, and then loads data. Conventionally, all of the queries are on the pre-defined structure which means that the data must exactly correspond to the pre-defined structure. If there are any changes to the data structure, the queries will not work.

The inventors propose a completely dynamic approach which eliminates the need for creating the data structure and then mapping the data into the structure and running the analysis on the structure. This system can discover the data structure dynamically, and can run the analytical directly on the derived structure of the data. The system discovers the structure of the data instead of defining the model and putting the data into the model. Because the system discovers the structure, the queries can be addressed to the current structure of the data. The queries/analytics can be associated with the discovered structure in real-time. This means analytics queries can be defined without knowing the full structure of the data and the system can discover the structure to apply the query.

This reflects the real-time and dynamic nature of the system. Many times new data is received dynamically, i.e., the data continues to be received as it changes. For example, with mashups 121, 123, 125, data is received as it is generated by a data source 127, 129, 131, 133, 135, 137, and many times the system does not know the data structure in advance. This is especially true for REST (Representational state transfer) services which do not define their structure. Instead, the structure of the data is discovered and then the analytics are run on the data according to the discovered data structure.

In this system, the visual element is connected to the discovered data structure. The analytics that are possible are visualized on the user interface, based on the discovered data structure and which analytics are possible for that discovered data structure.

The user is thus visually able to discover information about the data, to apply analysis and different functions to aspects of that data and then to visualize those new aggregates overlaid on the existing data. Based on that the user can continue to iteratively explore the data. The visualizer 101 allows the user to overlay the new analytics and functions on top of the original data and to visualize the data. The query builder 107 can generate the queries dynamically, and runs the queries dynamically, so that the user can continue to look at the data in different ways.

The filter controls 105 function of the system also allows the user to perform multiple, interrelated filters on the data, in which the filters are based on the discovered data. For example, values can be filtered out. The system discovers information about the types of the data. For example, for numeric data, the system automatically can provide a double-ended slider to slide on, for example, stock prices, to narrow a numeric value down to a range. For alpha data, the system can provide, in the filtering menu, selectable boxes to select which alpha data (e.g., name of stock, technology sector, etc.) to see just the data within those categories.

The visualizer 101 also provides the user with the ability to see the data in different charts, graphics, and the like. The charts and graphs, etc. are pluggable so that additional charts/graphs can be added by the user to the visualizer by interacting with the user interface.

IV. Details

Aspects of the present system, method and computer-readable medium can include one or more of the following, which are discussed in more detail herein:

A. Discovery of the structure of the data instead of generating a preliminary data model (structure) into which the data is run.
B. Preparation of the analytical queries which are generated for the data, based on the discovered data structure of the data.
C. Visualization of the applied analytics
D. Providing visual contextual data filters derived from sources of the data, not just what is visible in the user interface.
E. Providing the dashboard style user interface with pluggable charts, graphs, and visualizations.

A. Discovery of the Structure of the Data

Data is input, by a data feed, and/or from a database, and/or otherwise.

Data that arrives and on which auto-discovery is performed, may include, by way of example, one or more of the following: stock data (RSS feed); data about performance about machines that are being monitored (RPM, exhaust, temperature, fuel amount); data from a database or a table in a database or portion thereof; and/or variations or extensions thereof. That is, data might be subscription data, requested data, published data, and/or retrieved data. It is not important how or why the data arrives. Conventionally, there may be many analytic applications that expect to work on specific data, such as stock analytics. In comparison, however, the present system is not limited to a pre-determined set of data or pre-determined type or origin of data. The present system can be used with data for which the system does not know the type or origin.

The system can conveniently be implemented as an application, which presents a user interface. The user interface can allow the user to select, e.g., mashups, information from databases, data feeds, etc.

The cross filter model processor (CFMP) 109 can be used to discover the structure of the data. The data is input to the cross filter model processor 109. The CFMP 109 parses the data that comes in. Based on the parsed data, the CFMP 109 determines the overall structure of the information as well as the structure of the individual rows/columns/entries in the data, down to the level of discovering which information is textual, numeric, or other data types. Note, the CFMP 109 can be performed on live data which is not pre-prepared. Data filter techniques are generally known. However, using data filter techniques as further described herein in the context of dynamically generated analytics provides novelty over existing systems. Use of the CFMP 109 in this connection avoids the necessity of generating the model, and allows the automatic generation by the query builder 107 of the queries appropriate to the data. This avoids the necessity of the user having to manually type in the content of the queries themselves, and the necessity of a user needing to know what types of analytics are available for the different data.

Figure 2:
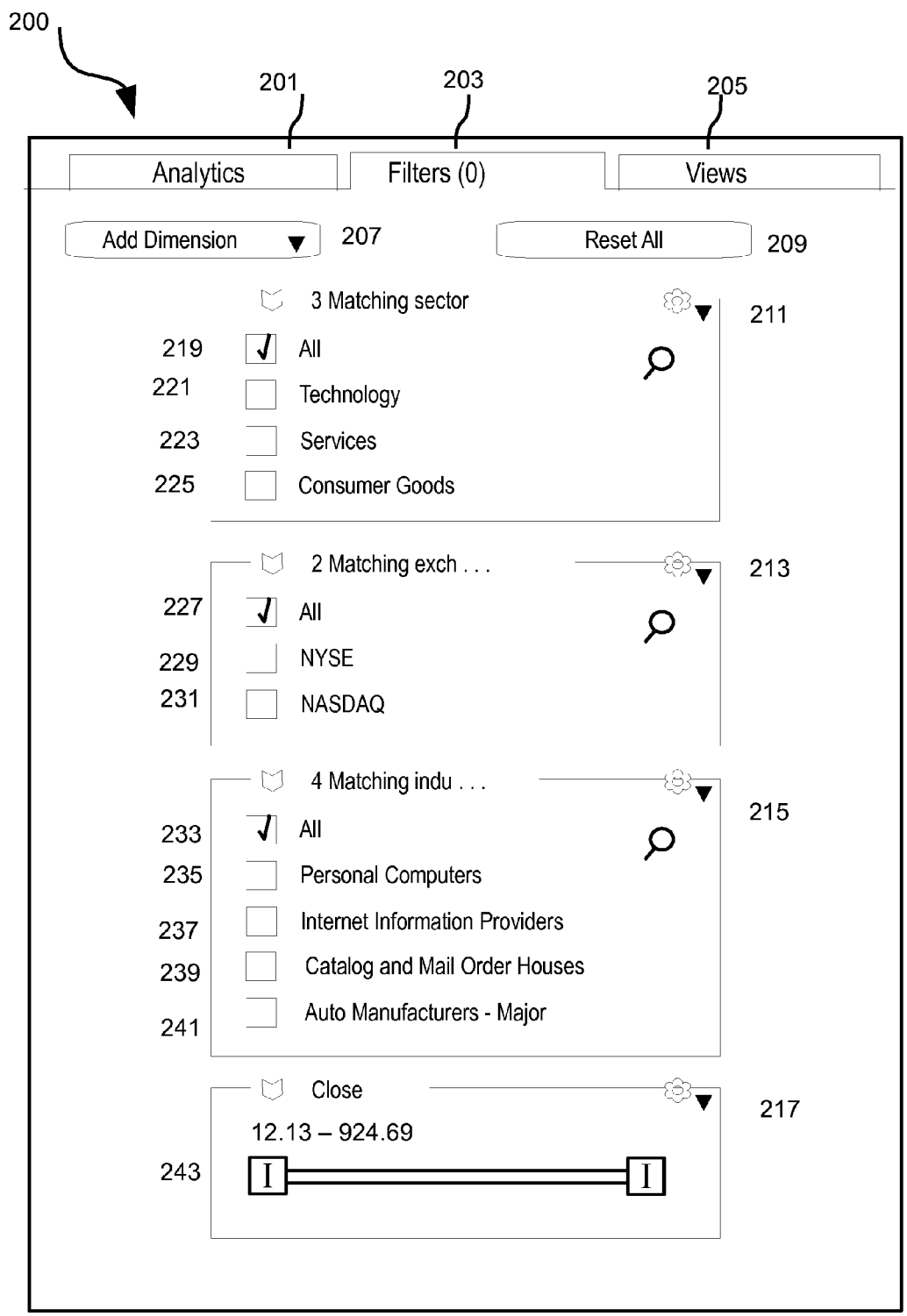
FIG. 2 is a user interface for cross filter model processor in the model-free process.

Reference is made to FIG. 2, a user interface 200 for cross filter model processor in the model-free process. The user interface 200 can offer tabs to access analytics 201, filters 203, and/or views 205. The filters 203 tab provides access to filters which were created by the CFMP. The filters 203 tab visualizes the structure and data types of the data which was discovered. Here, the data was discovered by the CFMP to have dimensions including "sector" 211, "exchange" 213, and "industry" 215. The CFMP, having discovered the dimensions of the data, can access storage which indicates a full set of known values which correspond to the data, for example based on data source, metadata description attached to the data, or the like. Alternatively, the CFMP can deduce the set of values from those values which the CFMP has received for that dimension and/or from the data type (e.g., text characters, numeric values, dates, time values, and the like). The filters 203 tab can then display each of the dimensions 211, 213, 215, 217; each of the dimensions can indicate the set of options for the dimension. For example, the "sector" dimension has selectable options 221, 223, 225 for technology, services, and consumer goods; the "exchange" dimension has selectable options 229, 213 for NYSE and NASDAQ; the "industry" dimension has selectable options 235, 237, 239, 241 for personal computers, internet information providers, catalog and mail order houses, and auto manufacturers-major; and the "close" dimension 217 has selectable options 243 (controlled by a slider) from 12.13 to 924.69. Filters are presented with selectable options which are appropriate for each dimension and which are determined to correspond to the discovered structure and the discovered data type of the data which belongs to that dimension 211, 213, 215, 217. By use of the selectable options 219-243, data which is of interest can be used and other, non-selected data can be filtered out and consequently ignored. In each of the dimensions, one or more or all allowed values can be selected, and numeric values can be filtered. It should be noted that the data can be from one or more sources of data, for example where the data source is a mashup which is itself combining data from one or more information sources. Thus, the dimensions offered under the filters 203 tab can have different data sources. Also, the filters 203 tab can offer a menu 207 to allow a user to add or cancel a dimension; in this way, dimensions which are not of interest can be filtered out in their entirety and consequently ignored. The filters 203 tab can offer standard user interface commands, here represented by the "reset all" 209 button.

In this way, data can be filtered out and ignored and the user has selected the data which the user wants to see. Note that there is no need for a model to have been created or for the data to be stored into the model. Here, by observing the data, the CFMP and filter controls have determined the dimensions of the data structure and the types of data which are in the data structure. Subsequently, the filters 203 tab presents the dimensions of the data structure and the options for each dimension.

B. Preparation of the Analytical Queries

The queries can be generated based on the user's interaction with the UI, in which the user selects the functions to be applied to data and which data the user wants to see. The UI can interact with a user so that one or more aggregations can be selected. The UI can interact with the user so that data can be filtered in one or more ways. Once the selections are made, the user can indicate completion of the selections, for example, by clicking a button. Metadata can then passed to a server component (an analytics service layer) that will then take the metadata, convert it into the query, and invoke the query on the data. The data, which continues to be dynamically received, continues to be processed by the query, so that the output of the query is continually updated as the data continues to be received. Consequently, a display and other elements of a user interface are dynamic as they are updated due to the dynamically received data.

Figure 3:
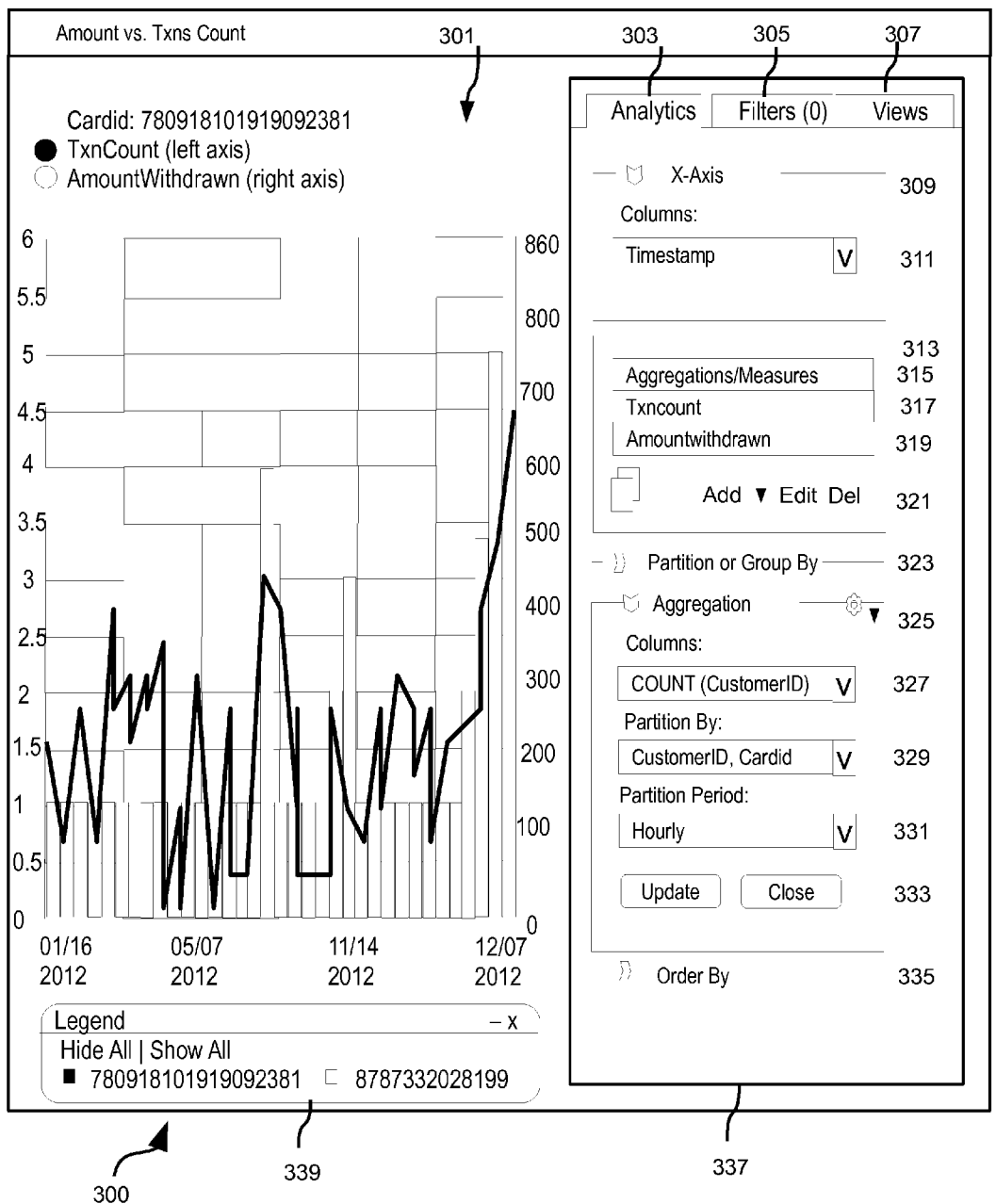
FIG. 3 is a user interface illustrating a display based on selected analytics in the model-free process.

Reference is made to FIG. 3, a user interface 300 illustrating a display based on selected analytics in the model-free process. As discussed above, the user interface 300 can offer tabs to access analytics 303, filters 305, and/or views 307. The analytics 303, filters 305, and/or views 307 tabs can conveniently be provided in a window 337 as illustrated. The filters 305 tab can provide the filters to include and/or exclude named data from the analytics, as discussed herein. The views 307 tab provides visual options for the user to select to display the results, as discussed herein. An analytics service layer, discussed elsewhere herein in more detail, can generate the query selected by the user and will invoke that query on the data (optionally as filtered).

Under the analytics 303 tab, the analytics which are available and which are appropriate for operating on the data type(s) in the data set of the data structure which was discovered by the CFMP are displayed as selectable options. Here, the analytics include X-axis 309, aggregations 313, partition or group by 323, and aggregation 325. Time frequently is an element of data structures, and a timestamp 311, date stamp, hourly, or the like can be a selectable option for the X-Axis analytic 309. Under the aggregations 313 analytic, Aggregations/Measures 315 selectable options are the data on which an analytic may be performed, here including transaction count (Txncount) 317 and Amountwithdrawn 319.

Reference is made to the two user selected aggregations under the Analytics tab, TxnCount and AmountWithdrawn 317, 319, and the selected aggregation 327 under the aggregations menu 325: "COUNT (CustomerID)". COUNT is the analytic, and CustomerID is the data on which the analytic can be performed. Several other analytics (not illustrated)

are listed as being available, for example in the illustrated pull-down aggregations menu 325. Other options in this example user interface 300 include where the data is partitioned 329 (e.g., by CustomerID, cardid), partition period 331, e.g., hourly, how the data is positioned, the period for positioning (e.g., hourly, yearly, past 10 days, past 100 weeks, etc.). The CFMP of the system has already parsed through the data and understands that the data includes, among other things, CustomerID, dollar values, date values and more, as discussed herein.

The system provides the different combinations of analytics appropriate for all of the different data types in the data set of the discovered data structure. Other standard analytics might be, for example, Count Customer ID, Average Amount, Count TransactionID, Linear Regression Amount, and similar. The analytics 303 tab can also provide an "order by" menu with selectable options as to how the data can be ordered, for example, alphabetic, time wise, etc.

FIG. 3 also illustrates a legend 339 (further discussed below) which can be used to filter the data. In this example, the data is filtered for Cardid. FIG. 3 also includes a view 301 corresponding to the data type of the data. Here, the data type of AmountWithdrawn and TxnCount (transaction count) can be displayed as a bar chart and line graph, as illustrated.

For the example shown in FIG. 3, the system is programmed to automatically, in response to the user selections of FIG. 3, generate the query shown in FIG. 4 based on user selections. There is no need for the user to write any portion of the query.

Reference is made to FIG. 4, a query 401 generated by user selections corresponding to FIG. 3. The query can be updated with each selection by the user, or for example when a user selects an "update" button 333, or similar. When the user causes system to run the data against the query, such as by selecting the update button, the query of FIG. 4 is run against the received data—which has not been inserted into a model. The query of FIG. 4 can continue to be run against data as it is received, and any view(s) can be updated to reflect the current query results.

Figure 5:
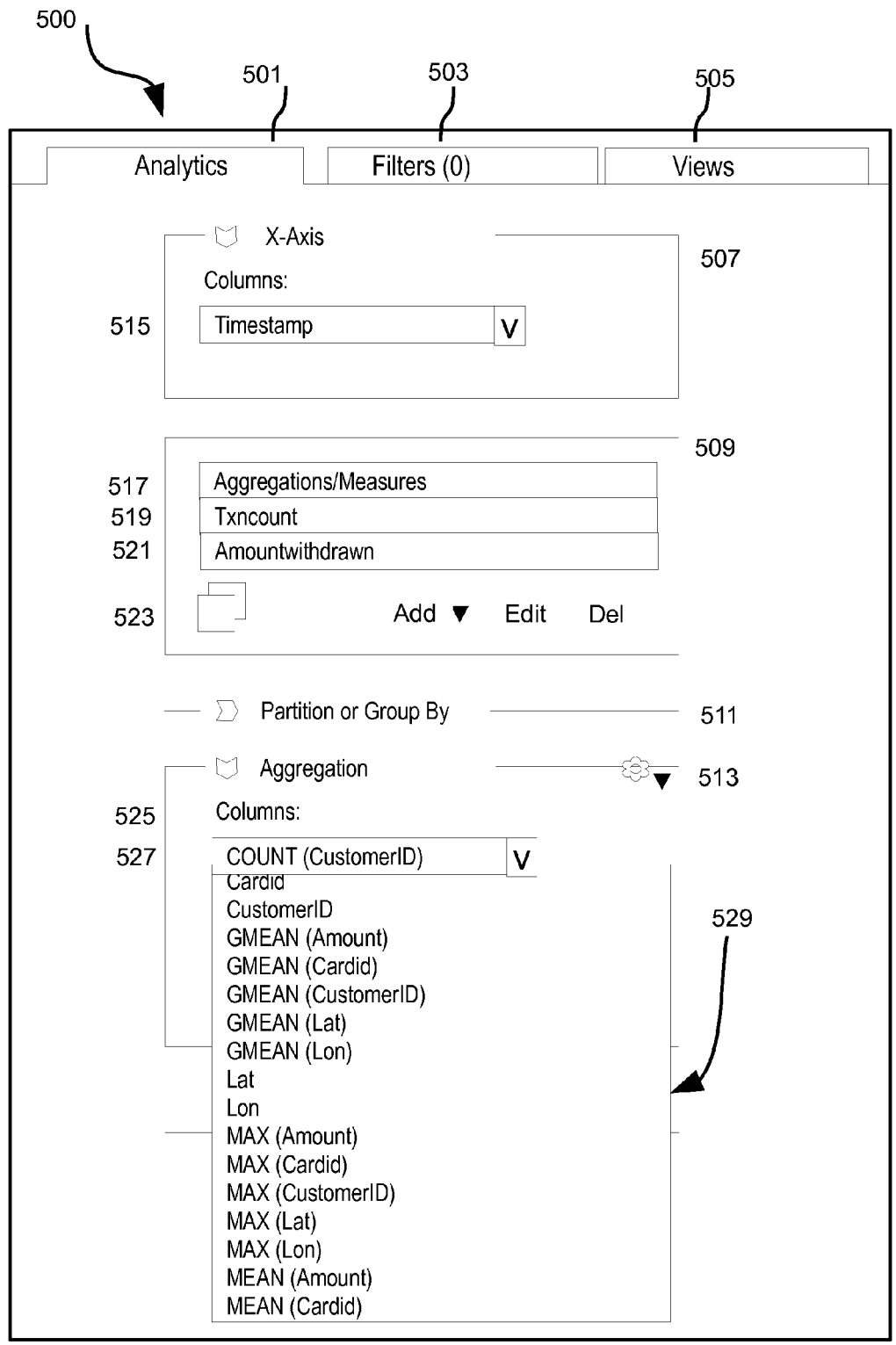
FIG. 5 is a user interface for selecting analytics corresponding to the data in the model-free process.

Reference is made to FIG. 5, a user interface 500 for selecting analytics corresponding to the data in the model-free process. As discussed above, the user interface 500 can offer tabs to access analytics 501, filters 503, and/or views 505.

Any available analytic can be used, however, if displayed so that it is selectable is assumed to be appropriate for the data. Many analytics are conventional and known as a general matter. The user can select the combination of analytics and data, without needing to know how to type in the query. The data may be sent to an analytics server, as discussed herein, which returns the data for the user interface. 500.

In the example of FIG. 5, the available analytics include X-Axis analytic 507, aggregations/measures 509, partition or group by 511, and aggregation 513.

If one of the data columns is a time series, the system may auto discover that, and provide a time stamp 515 as a selectable option, for example as the X-Axis analytic 507. The system then will provide the user with a temporal view, e.g., with dates.

Here, there are two user selected data types for aggregations/measures 517 under the aggregations/measures menu 509, TxnCount and AmountWithdrawn 517, 519. The user interface 500 can 523 add, edit, and/or delete, responsive to user selection, data types which are selected for aggregations/measures. The selected aggregation 527 under the aggregations menu 525 in this example is "COUNT (CustomerID)". COUNT is the analytic, and CustomerID is the data on which the analytic can be performed. Several other analytics are illustrated in the pull-down aggregations menu 529. The other available analytics which are offered are the different analytics which are possible for each of the data types in the data set. Here, the illustrated analytics include GMEAN, Max, and Mean; other examples of analytics are Sum, Count and Average, and the like.

C. Visualization of the Applied Data Analytics

The visualizer decides which user interface controls to provide the user based on the data types when creating filters. Sliders or check boxes are convenient examples, in which sliders are used for numeric data and check boxes are used for textual data.

The visualizer provides different selectable analytics which are visually associated with the different data types, based on the structure of the data. For example, different analytics are appropriate for operation on numeric data, vs. periodic information which can use other analytics. This may be very valuable to the user and avoids the necessity of the user knowing which analytics are available.

Figure 6:
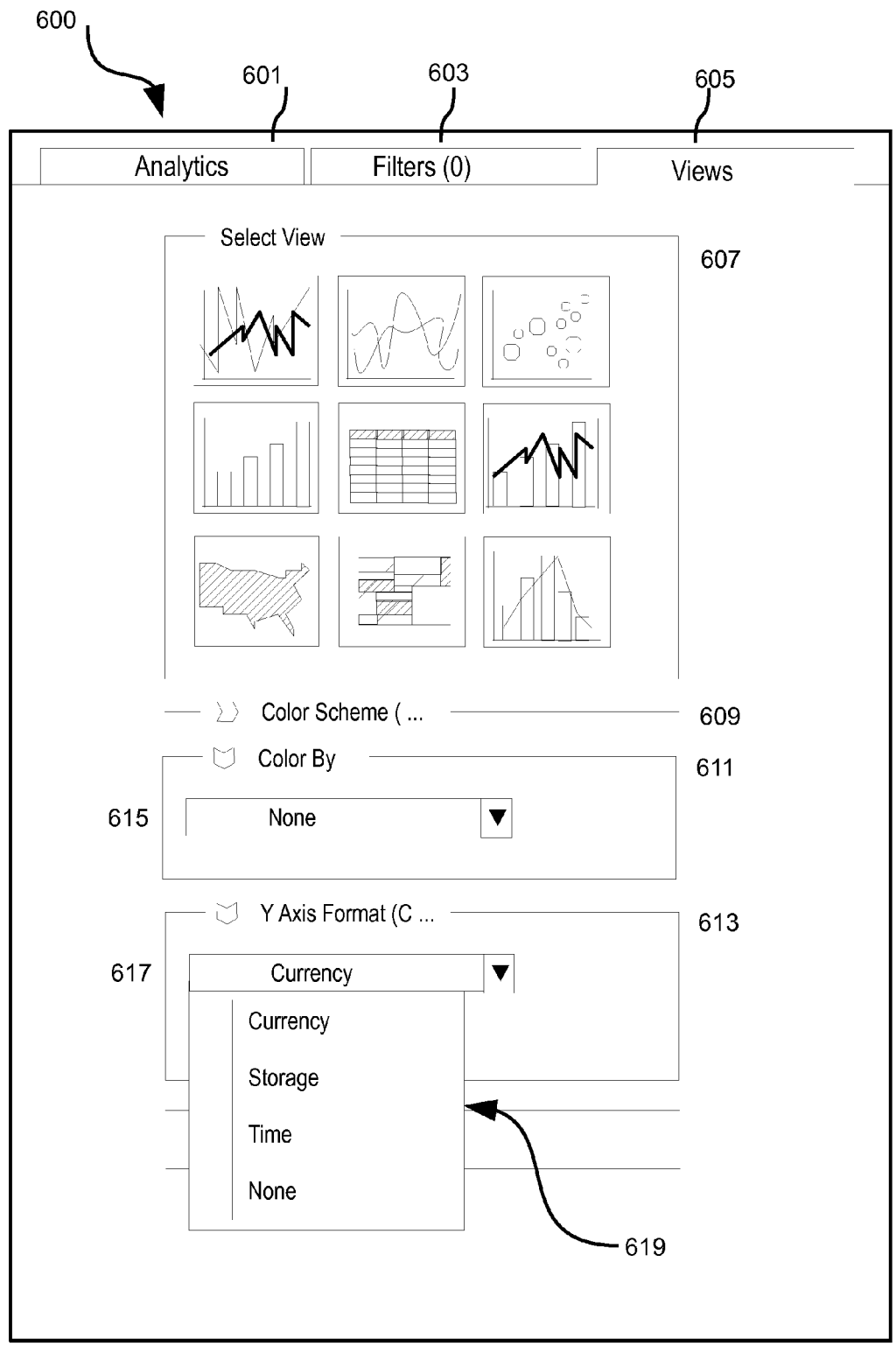
FIG. 6 is a user interface that provides selectable views corresponding to the data in the model-free process.

Reference is made to FIG. 6, a user interface 600 that provides selectable views corresponding to the data in the model-free process. The user interface 600 offers analytics 601, filters 603 and views 605 tabs. Under the views 605 tab, based on the data which has been filtered under the filters 603 tab, plural views 607 which correspond to the discovered data type(s) of the discovered data are offered. The user can select one or more of the selectable views 607. The user interface 600 can offer a color scheme 609 to apply to the selected view. The user interface 600 can offer a color-by menu 611 to further determine how color is applied 615. The user interface 600 can offer a selectable Y-Axis format option 613, to select a data type 617 of the discovered data which is appropriate for the Y-Axis.

The options 609, 611, 613, 619 selected by the user may be applied to the selected view 607, to generate a view of the received data—which is filtered according to the filters 603 tab—according to the selected one of the views and the selectable options which were selected.

In an example operation, a user can see their stocks, on the stock ticker, and the analytics which can be performed on that data. For example, the system will determine which data is of a type that can have a linear regression model run on it and provide that option to the user.

Thus, the system gets rid of not only the conventional front-end set-up and model creation, but also the writing of analytics scripts by the user. User-interface selection provides the information for the system to write out the script. Once the data is analyzed, the user can conveniently select from different available visualizations to graphically represent the data. The system also can allow for additional formatting, like color schemes visual data partitioning (color by) and axis formatting. These may be dynamically configured based on the visualization configurations.

D. Providing Visual Contextual Data Filters

When analyzing data, it is not unusual for a user to continue to filter data to reduce the data set to get a clearer picture. Most tools require the user to write filters such as ">100" or "last name='Smith'". The system disclosed herein automatically creates queries that can be executed, e.g., on the server, which calculate distinct data values and data ranges and present visual selectors as a filtering mechanism. All performance on the actual data sources and values can be based on distinct raw data, aggregate or analytic functions and any combination of both.

Reference is made to FIG. 7, a user interface for a visual contextual data filter. Here, a menu 700 is provided to add or cancel a dimension 701 from the filters, or optionally to reset all of the filters 703. In this example, the add dimension menu 701 is a pull down menu 707 which lists all of the data types which can be filtered, and for a selected data type 715, provides options for how the data type can be viewed, here as a checkbox 711 or a slider 713 for Cardid. In this way, the user interface provides specific options for each individual data type, and all of the options provided for the individual data type are applicable to the data type.

Figure 8:
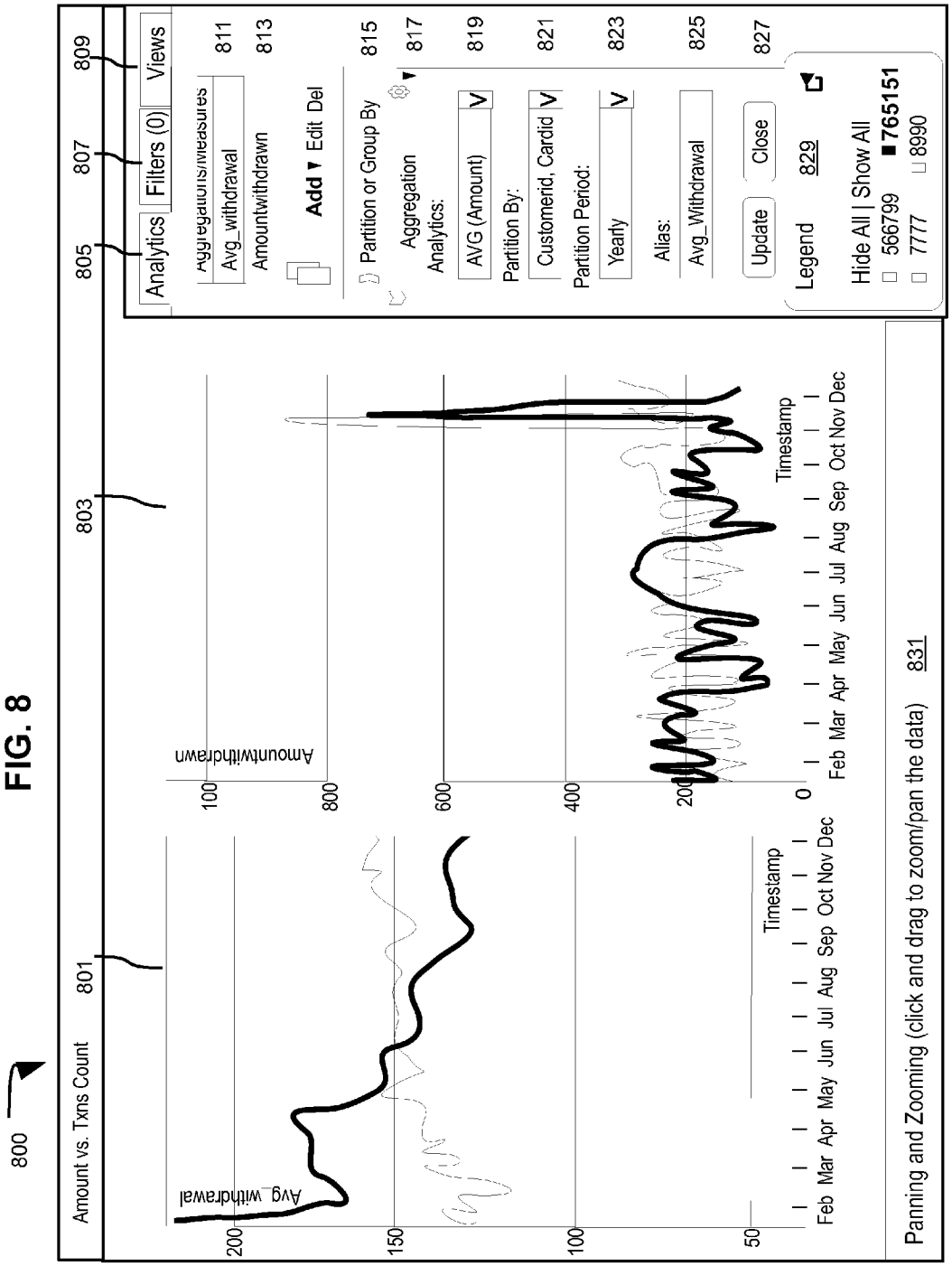
FIG. 8 is another user interface illustrating a display based on the selected analytics in the model-free process.

Reference is made to FIG. 8, another user interface 800 illustrating a display based on the selected analytics in the model-free process. As discussed above, the user interface 800 can provide an analytics 805 tab, a filters 807 tab and a views 809 tab so that the user can direct the system to the data which is of interest, which analytics to use on the data, and which views to display, all of which are selectable but are provided as options which are all possible for the discovered structure and the discovered data type of the data.

Analytics partitioned by a specific data dimension are automatically available as UI filters/legends. As shown in the screen of FIG. 8, the legend 829 shows a list of unique customer ids that can be used to visually filter the charts. If multiple models are partitioned differently, unique values across all partitions will be displayed in the legend window. A user can also mouse-over the entries to highlight appropriate data series in the visualization. Additionally when comparing complex datasets analytics across different domains on the y-series, such as total amount withdrawn and avg withdrawals, a user can split the charts into separate windows for easier comparison.

Under the analytics 805 tab, the analytics which are available and which are appropriate for operating on the data type(s) in the data set of the data structure which was discovered by the CFMP are displayed as selectable options. Here, the analytics include aggregations (partially hidden), partition or group by 815, and aggregation 817. The Aggregations/Measures include Avg_withdrawal 811 and Amountwithdrawn 813. The selected aggregations 819, 821 under the aggregations menu 817 are "AVG (Amount)" and "COUNT (CustomerID)". AVG and COUNT are the analytics, and Amount and CustomerID are the data on which each analytic respectively is performed. Other options in this example user interface 800 include partition period 823, e.g., yearly, and alias (Avg_Withdrawl) 825. The analytics 805 can include an update/close button 827 to cause the system to update the views 801, 803. At this point, the analytic queries actually process the received data, as selected per the filters, according to the current selected options for the analytics 805. Additional view operations 831 can be provided according to known techniques for operating on the views 801, 803, such as to pan/zoom on the data in the views.

E. Providing the Dashboard Style User Interface

Historically, analytical tools required sophisticated and timely scripting and programming to create analytics, to apply the analytics to the data, and then to visualize. By contrast, an embodiment of the system disclosed herein can provide a visual dashboard as the canvas from which the user can create, apply and visualize analytical data. The user can focus on building a visual dashboard, while the system can monitor the user's activity and generate contextual analytics queries to accelerate visualizations. The user does not have to write the analytics in order to apply them to make the information visual.

Additionally, the system can allow users to contextually link explorations to the existing dashboard, passing in appropriate context to view additional information pertinent to the current exploration. For example, when exploring information regarding ATM fraud activity data partitioned by customers, a user will most probably want to check additional information on one or more customers about their specific withdrawal activity, withdrawal locations, patterns, etc. Once a user makes the system aware of the relationship between the customerid dimension and an existing "Customer Information" dashboard, all explorations partitioned by customerid can include links to view additional information about a customer.

Figure 9:
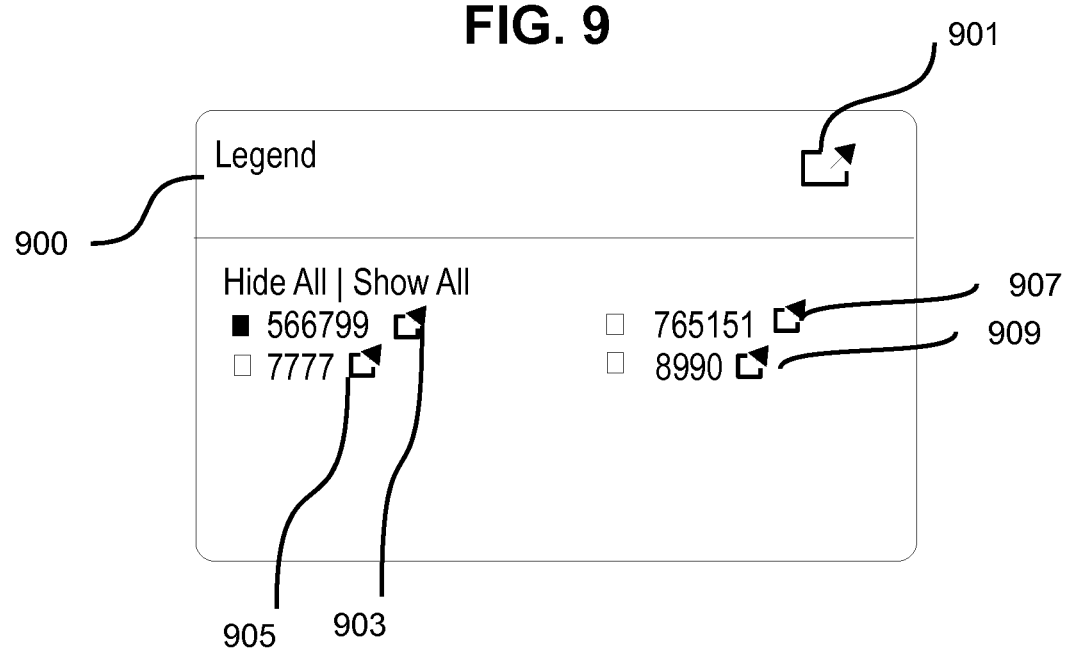
FIG. 9 is a user interface legend with a contextual link to additional data.

FIG. 9 shows a legend with such contextual dashboard link enabled, arrow links next to each customerid, making it easy to view additional information on each customer.

Reference is made to FIG. 9, a user interface legend 900 with a contextual link to additional data. In this example, the legend 900 includes a contextual link 901 to the overall data type; and contextual links 903, 905, 907, 909 for each of the data of the data type (customerid) which can link to additional information which is related to the "customerid" dimension.

F. Example Embodiments

Figure 10:
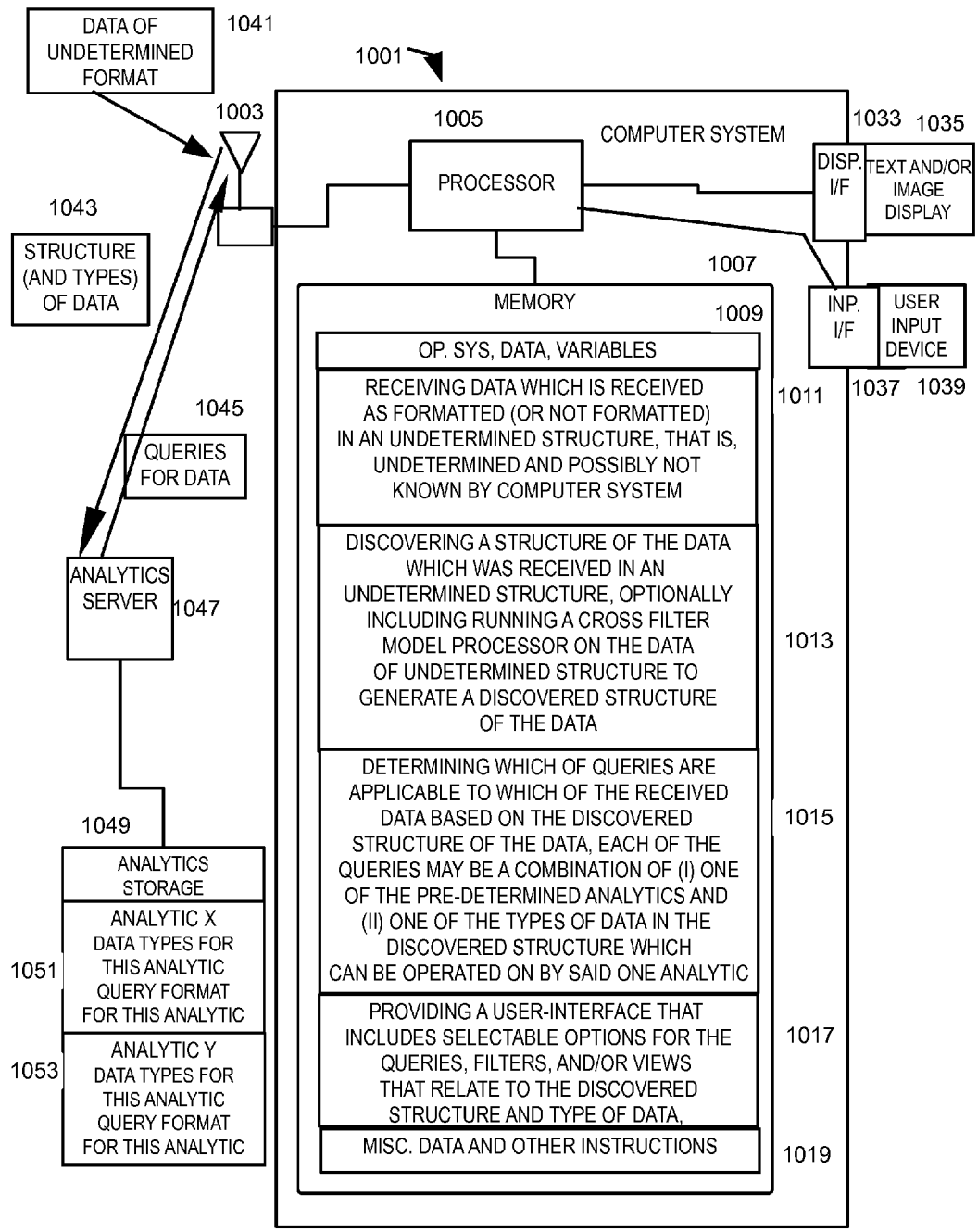
FIG. 10 is a block diagram illustrating portions of a computer system.

Reference is made to FIG. 10, a block diagram illustrating portions of an exemplary computer system. The computer system 1001 may include a communication port and/or transceiver 1003 or the like for optional communication with an analytics server 1047, a processor 1005, a memory 1007, a display interface 1033, a display 1035, an input interface 1037, and/or a user input device 1039 such as a keyboard, trackball, mouse, joystick, pointing device, and/or similar.

The analytics server 1047 can be a computer processor that executes on a separate processor to receive structure 1043 (and indications of types, e.g., in metadata attached to a request) of data, to determine which of a set of analytics, for example stored in analytics storage 1049, can operate on data of that structure (and data type). Each of the analytics 1051, 1053 in the analytics storage 1049 can indicate one or more data type for that analytic, and a query format for that analytics. In response to the requested structure (and types) of data 1043, the analytics server 1047 can determine which of the analytics 1051, 1053 in the analytics storage 1049 correspond to the structure (and types) of data 1043; the analytics server 1047 can prepare a query into which the metadata for the structure is inserted, and can return the analytics query or queries for the data 1045 to the requestor, for example, the computer system 1001. The analytics server functions can be distributed between one or both of the analytics server 1047 (as illustrated here) and optionally the computer system 1001 according to known techniques.

The computer system 1001 can receive data 1041 of an undetermined format, for example, from one or more web services as an information-providing service, from a database, or other means to obtain data from a data source.

The illustrated communication port/transceiver 1003 is representative of one or more receiver and/or transmitter and/or transceiver communication ports, for wired or wireless communication, over a computer network or communication network.

The processor 1005 may comprise one or more microprocessors and/or one or more digital signal processors. The memory 1007 may be coupled to the processor 1005 and may comprise a read-only memory (ROM), a random-access memory (RAM), a programmable ROM (PROM), and/or an electrically erasable read-only memory (EEPROM). The memory 1007 may include multiple memory locations for storing, among other things, an operating system, data and variables 1009 for programs executed by the processor 1005; computer programs for causing the processor to operate in connection with various functions such as receiving 1011 data which is received as formatted (or not formatted) in an undetermined structure, that is, undetermined and possibly not known by the computer system; discovering 1013 a structure of the data which has been received in an undetermined structure, optionally including running a cross filter model processor on the data of undetermined structure to generate a discovered structure of the data; determining 1015 which of queries are applicable to which of the received data based on the discovered structure of the data, each of the queries is a combination of (i) one of the analytics and (ii) one of the types of data in the discovered structure which can be operated on by said one analytic; providing 1017 a user-interface that includes selectable options for the queries, filters, and/or views that relate to the discovered structure and type of data; and/or other processing; and a database 1019 for other information used by the processor 1005. The computer programs may be stored, for example, in ROM or PROM and may direct the processor 1005 in controlling the operation of the computer system 1001. Each of these functions is considered in more detail elsewhere herein.

The user may invoke functions accessible through the user input device 1039, interface with the processor 1005 through an input interface 1037. The user input device 1039 may comprise one or more of various known input devices, such as a keyboard and/or a pointing device, such as a mouse; the keyboard may be supplemented or replaced with a scanner, card reader, or other data input device; the pointing device may be a mouse, touch pad control device, track ball device, or any other type of pointing device; and the input interface 1037 can be a known interface thereof to communicate with the processor 1005.

The text and/or image display 1035 is representative of a display that may present information to the user by way of a conventional liquid crystal display (LCD) or other visual display, and/or by way of a conventional audible device for playing out audible messages. The display interface 1033 can be a known interface thereof to communicate between the processor 1005 and the display 1035.

Responsive to signaling from the user input device 1039, in accordance with instructions stored in memory 1007, or automatically upon receipt of certain information via the communication port and/or transceiver 1003, the processor 1005 may direct the execution of the stored programs.

The computer system 1001 discussed here or elsewhere in this document can include a central processing unit (CPU) with disk drives (not illustrated), symbolic of a number of disk drives that might be accommodated by the computer. Typically, these might be one or more of the following: a floppy disk, a hard disk, a CD ROM, a digital video disk, an optical disk, a removable flash memory, or the like, or variations thereof. The number and type of drives may vary, typically with different computer configurations. Disk drives may be optional, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serve as the main information highway interconnecting other components of the computer, and can be connected via an interface to the computer. A disk controller (not illustrated) can interface disk drives to the system bus. These may be internal or external.

It should be understood that FIG. 10 is described in connection with logical groupings of functions or resources. One or more of these logical groupings may be omitted from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 11:
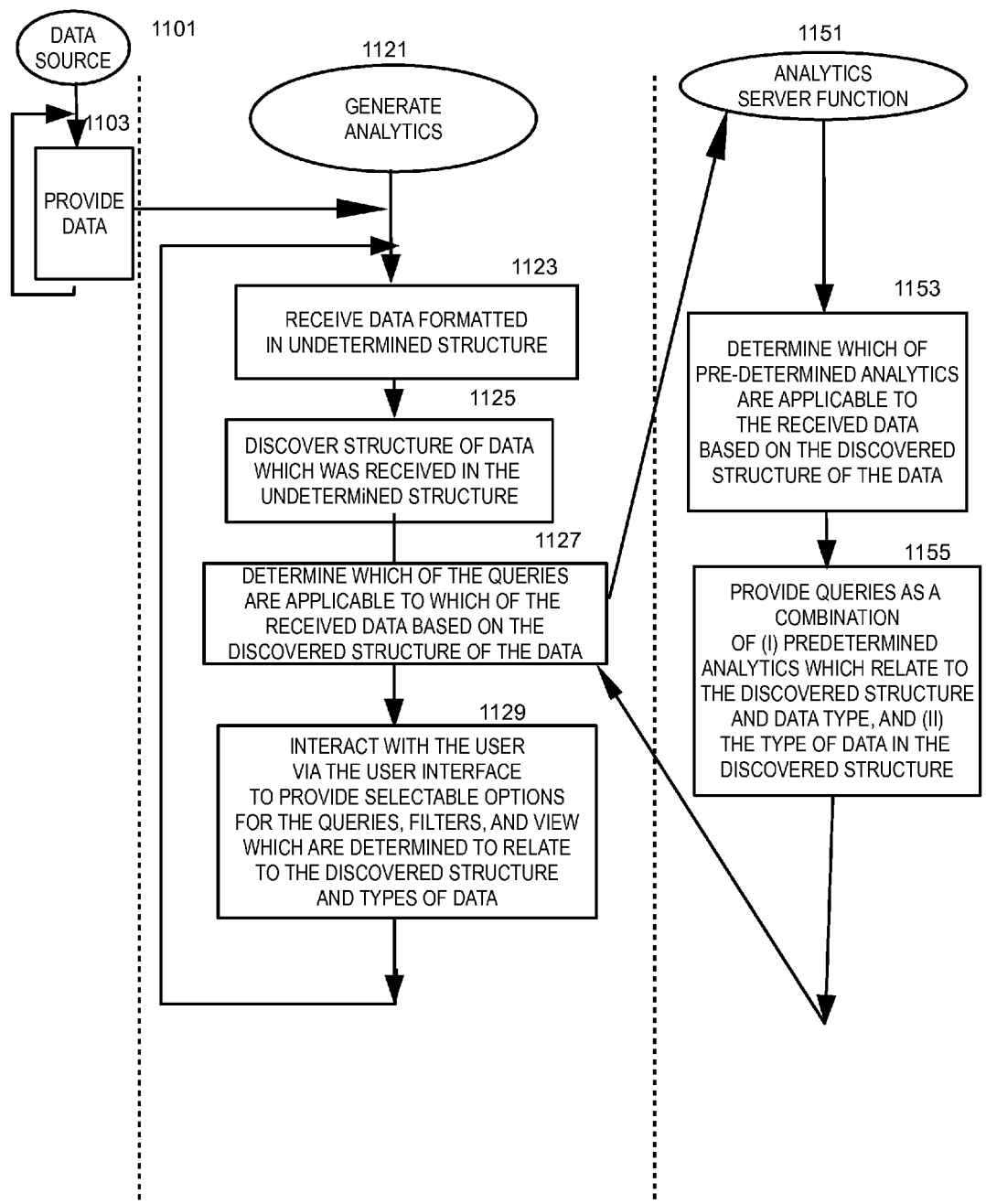
FIG. 11 is a flow chart illustrating a process for generating analytics.
Figure 12:
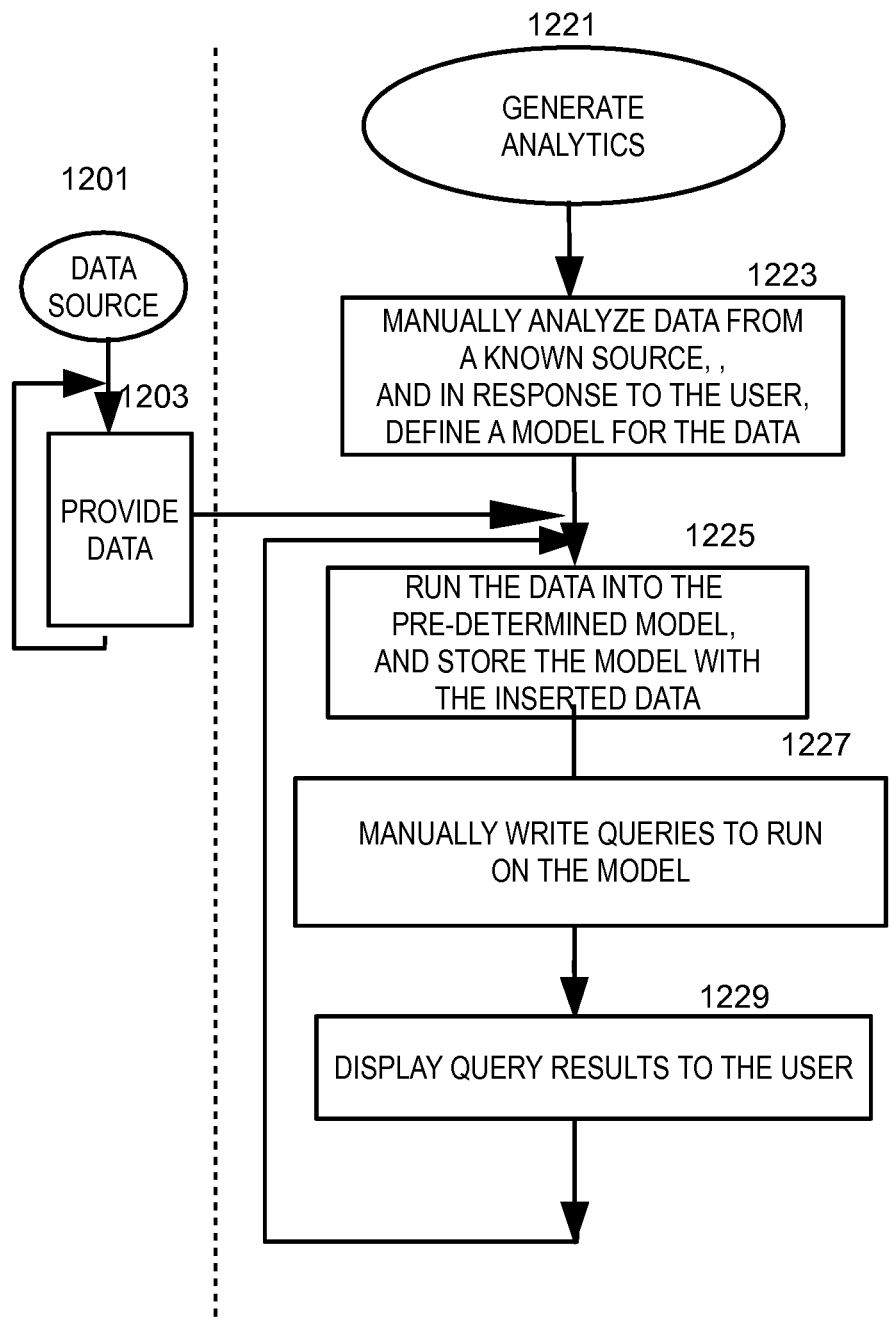
FIG. 12 is a flow chart illustrating a prior art process for generating analytics.

Reference is made to FIG. 11, a flow chart illustrating a process for generating analytics. The process can be executed on the system of FIG. 10, or other hardware appropriately configured. In this illustration, there are three concurrent processes: a data source 1101 process, a generate analytics 1121 process, and an analytics server function 1151 process.

The data source 1101 process will provide data 1103. The data can be provided in any known way, such as by publishing data, retrieving database data, obtaining data from a transmission such as an RSS feed, receiving data from a mashup, or similar.

The analytics server function 1151 can receive a data structure. In response to receiving a data structure and a data type, the analytics server function 1151 can provide the analytics which can operate on the data structure and data type which is discovered. That is, for each of the types of data in the data structure, the analytics server can determine 1153 which of the analytics operate on that type of data, and can determine a combination of each one of the analytics and the type of data in the data structure on which it operates. Each combination of analytics and type of data can be returned as a structure query, which can be run against the data in the data structure.

The process to generate analytics 1121 can receive 1123 data formatted in an undetermined structure, which is to say, it is unknown what the structure of the data is. Such data can be received from the data source 1101. The process 1121 can discover 1125 the structure of the data which was received in the undetermined structure. Such processes are discussed elsewhere herein in connection with the CFMP. The process 1121 can determine 1127 which of the queries are applicable to the received data, which may be filtered, based on the discovered structure of the data. This can be done by sending a request to and receiving a response from the analytics server function 1151. The process to generate analytics 1121 can provide a user interface so as to interact 1129 with a user via the user interface to provide selectable options for the queries, filters, and view options which are determined to relate to the discovered structure and types of data. It should be noted that the process to generate analytics 1121 can loop, to receive additional data, and to apply selected options for queries, filters and views.

In this way, it is unnecessary for the system or user to have an a priori knowledge of the structure of the data. It is unnecessary for the user to have a knowledge of possible analytics which can be run on the data, and how to structure queries. The system can provide data which the user has indicated is of interest, and in response to that data the system can provide user-selectable analytics which are limited to those appropriate to the data.

G. Miscellaneous

The above discussion has involved particular examples. However, the principles apply equally to other examples and/or realizations. Naturally, the relevant data may differ, as appropriate. Further, the above has been discussed in certain examples as if made available by a provider to a single user at a single site. The above described system, device and/or method may be used by numerous users over distributed systems, if preferred.

Furthermore, the communication networks in an embodiment can include by way of example but not limitation data and/or packet communications networks, which can provide wireless communications capability and/or utilize wireline connections such as cable and/or a connector, or similar. Any appropriate communication protocol may be used.

A computer-readable storage medium is tangible and non-transitory; a computer-readable storage medium can be any of the memory or disks, such as those examples described above, or other removable or fixed storage medium, provided such computer-readable storage medium is tangible and non-transitory.

One or more displays for the system may be developed in connection with, by way of example but not limitation, HTML display format. Although HTML may be the preferred display format, it is possible to utilize alternative display formats for interacting with a user and obtaining user instructions.

The system used in connection with various embodiments may (or may not) rely on the integration of various components including, as appropriate and/or if desired, but not by way of limitation, hardware and software servers, applications software, database engines, server area networks, firewall and SSL security, production back-up systems, and/or applications interface software. The configuration may be, preferably, but not by way of limitation, network-based and can utilize the Internet as an exemplary interface with the user for information delivery.

The various databases may be, by way of example but not limitation, in a relational database format, but other standard data formats may also be used. Windows 2007, for example, may be used, but other standard operating systems may also be used. Optionally, the various databases include a conversion system capable of receiving data in various standard formats.

The foregoing detailed description includes many specific details. The inclusion of such detail is for the purpose of illustration only and should not be understood to limit the invention. In addition, features in one embodiment may be combined with features in other embodiments of the invention. Various changes may be made without departing from the scope of the invention as defined in the following claims.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A computer-implemented method for generating analytics applicable to data of an undetermined structure and type, comprising:
   receiving, by a processor device, data which is formatted in an undetermined structure, wherein the data continues to be received;
   discovering, by the processor device using a cross filter model processor, dynamically in response to receiving the data which is formatted in the undetermined structure, a structure and a data type of the data which was received in the undetermined structure, wherein the cross model filter processor continually discovers dimensions or datatypes of the data and deduces a full set of values which correspond to the discovered dimensions and data types of the data which is continually received; and
   determining, by the processor device in response to the structure and the data type of the data which are continually discovered by the cross filter model processor, which of a plurality of analytic queries are applicable to the data, wherein the processor device continually determines the analytic queries,
   wherein the data which continues to be received is continuously operated on by a selected one of the plurality of analytic queries determined to be applicable and a user interface is continuously updated to reflect the data which is continuously received and continuously operated on.

2. The computer-implemented method of claim 1, further comprising
   displaying, by the processor device on a user interface, the analytic queries which were determined to be applicable to the discovered structure and the discovered data type of the data, and selectable options for the analytic queries, in which all of the analytic queries displayed on the user interface are possible for the discovered structure and the discovered data type of the data;
   generating, by the processor device, automatically without user intervention, the selected one or more of the analytic queries, in response to selection of a displayed one or more of the analytic queries and the selectable options for the selected one or more of the analytic queries; and
   performing, by the processor device, the selected one or more of the analytic queries on the received data.

3. The computer-implemented method of claim 2, wherein each of the analytic queries which are displayed is a combination of (i) one or more of the analytic queries which were determined to be applicable to the discovered structure and the discovered data type of the data, and (ii) the data type of the data in the discovered structure which can be operated on by the one or more of the analytic queries.

4. The computer-implemented method of claim 1, further comprising determining, by the processor device, which of a plurality of filters correspond to the discovered data type of the data;

displaying, by the processor device on a user interface, selectable options for the filters which were determined to correspond to the discovered structure and the discovered data type of the data; and performing, by the processor device, a selected one or more of the filters on the received data, in response to selection of a displayed one or more of the filters and the selectable options for the one or more of the filters.

5. The computer-implemented method of claim 4, wherein the filters for one or more of the data types which is discovered to be numeric include at least an automatic slide to filter numeric values of the data which has a numeric data type to within the selected region.

6. The computer-implemented method of claim 1, further comprising determining, by the processor device, which of a plurality of views correspond to the discovered data type of the data;

providing the user interface that includes selectable options for the views which were determined to correspond to the discovered structure and data type of the data; and processing, by the processor device, the received data to provide a view of the received data according to a selected one or more of the views and the selectable options for the selected one or more of the views.

7. The computer-implemented method of claim 1, wherein the data is received by the processor device from at least one of a mashup, a published data stream, and a database.

8. The computer-implemented method of claim 1, wherein the structure of the data is discovered in the cross filter model processor without running the data of the undetermined structure into a model that defines the data.

9. A computer system for generating analytics applicable to data of an undetermined structure and type comprising:

a display interface;

a user input device interface; and a processor cooperatively operable with the display interface and the user input device interface, and configured to facilitate receiving data which is formatted in an undetermined structure, wherein the data continues to be received;

discovering, using a cross filter model processor, dynamically in response to receiving the data which is formatted in the undetermined structure, a structure and a data type of the data which was received in the undetermined structure, wherein the cross model filter processor continually discovers dimensions or datatypes of the data and deduces a full set of values which correspond to the discovered dimensions and data types of the data which is continually received; and determining, in response to the structure and the data type of the data which are continually discovered by the cross filter model processor, which of a plurality of analytic queries are applicable to the data, wherein the processor device continually determines the analytic queries, wherein the data which continues to be received is continuously operated on by a selected one of the plurality of analytic queries determined to be applicable and a user interface on the display interface is continuously updated to reflect the data which is continuously received and continuously operated on.

10. The computer system of claim 9, wherein the processor is further configured to facilitate displaying, via the display interface, the analytic queries which were determined to be applicable to the discovered structure and the discovered data type of the data, and selectable options for the analytic queries, in which all of the analytic queries displayed on the display interface are possible for the discovered structure and the discovered data type of the data;

generating, automatically without user intervention, the selected one or more of the analytic queries, in response to selection of a displayed one or more of the analytic queries and the selectable options for the selected one or more of the analytic queries; and performing the selected one or more of the analytic queries on the received data.

11. The computer system of claim 10, wherein each of the analytic queries which are displayed is a combination of (i) one or more of the analytic queries which were determined to be applicable to the discovered structure and the discovered data type of the data, and (ii) the data type of the data in the discovered structure which can be operated on by the one or more of the analytic queries.

12. The computer system of claim 9, wherein the processor is further configured to facilitate determining which of a plurality of filters correspond to the discovered data type of the data;

displaying, via the display interface, selectable options for the filters which were determined to correspond to the discovered structure and the discovered data type of the data; and performing a selected one or more of the filters on the received data, in response to selection of a displayed one or more of the filters and the selectable options for the one or more of the filters.

13. The computer system of claim 12, wherein the filters for one or more of the data types which is discovered to be numeric include at least an automatic slide to filter numeric values of the data which has a numeric data type to within the selected region.

14. The computer system of claim 9, wherein the processor is further configured to facilitate determining which of a plurality of views correspond to the discovered data type of the data;

providing, via the display interface, the user interface that includes selectable options for the views which were determined to correspond to the discovered structure and data type of the data; and processing the received data to provide a view of the received data according to a selected one or more of the views and the selectable options for the selected one or more of the views.

15. The computer system of claim 9, wherein the data is received from at least one of a mashup, a published data stream, and a database.

16. The computer system of claim 9, wherein the structure of the data is discovered in the cross filter model processor without running the data of the undetermined structure into a model that defines the data.

17. A non-transitory computer-readable medium storing instructions for executing for a method for generating analytics applicable to data of an undetermined structure and type, the instructions when executed perform:

receiving data which is formatted in an undetermined structure, wherein the data continues to be received;

discovering, using a cross filter model processor, dynamically in response to receiving the data which is formatted in the undetermined structure, a structure and a data type of the data which was received in the undetermined structure, wherein the cross model filter processor continually discovers dimensions or datatypes of the data and deduces a full set of values which correspond to the discovered dimensions and data types of the data which is continually received; and determining, in response to the structure and the data type of the data which are continually discovered by the cross filter model processor, which of a plurality of analytic queries are applicable to the data, wherein the processor device continually determines the analytic queries, wherein the data which continues to be received is continuously operated on by a selected one of the plurality of analytic queries determined to be applicable and a user interface is continuously updated to reflect the data which is continuously received and continuously operated on.

18. The non-transitory computer-readable medium of claim 17, further comprising instructions for displaying, on a user interface, the analytic queries which were determined to be applicable to the discovered structure and the discovered data type of the data, and selectable options for the analytic queries, in which all of the analytic queries displayed on the user interface are possible for the discovered structure and the discovered data type of the data;

generating, by the processor device, automatically without user intervention, the selected one or more of the analytic queries, in response to selection of a displayed one or more of the analytic queries and the selectable options for the selected one or more of the analytic queries; and performing the selected one or more of the analytic queries on the received data.

19. The non-transitory computer-readable medium of claim 17, further comprising instructions for determining, which of a plurality of filters correspond to the discovered data type of the data;

displaying, on a user interface, selectable options for the filters which were determined to correspond to the discovered structure and the discovered data type of the data; and performing a selected one or more of the filters on the received data, in response to selection of a displayed one or more of the filters and the selectable options for the one or more of the filters.

20. The non-transitory computer-readable medium of claim 17, further comprising instructions for determining which of a plurality of views correspond to the discovered data type of the data;

providing the user interface that includes selectable options for the views which were determined to correspond to the discovered structure and data type of the data; and processing the received data to provide a view of the received data according to a selected one or more of the views and the selectable options for the selected one or more of the views.

* * * * *